(No Model.)
J. PINTSCH.
Packing for Gas Engines and Pipes.
No. 233,370. Patented Oct. 19, 1880.
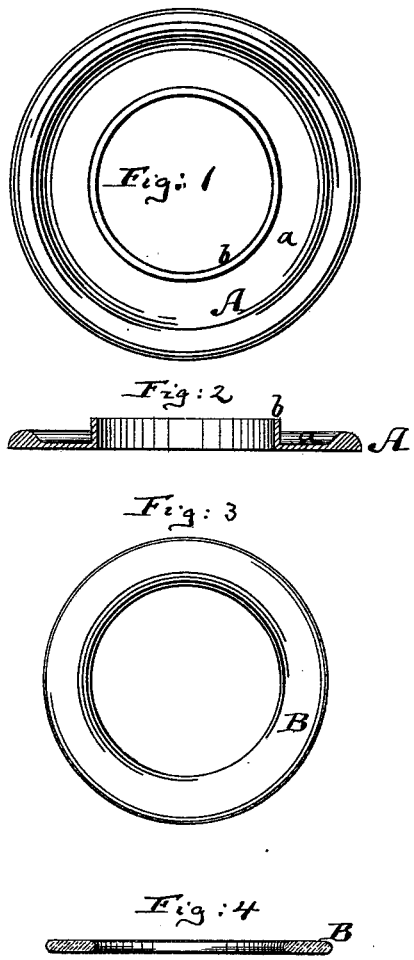
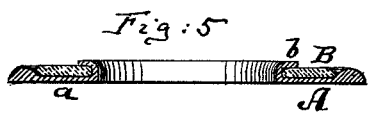
Witnesses:
John C. Tunbridge
Willy G. E. Schultz
Inventor:
Julius Pintsch
by his attorney
A. v. Briesen

UNITED STATES PATENT OFFICE.

JULIUS PINTSCH, OF BERLIN, PRUSSIA.

PACKING FOR GAS ENGINES AND PIPES.

SPECIFICATION forming part of Letters Patent No. 233,370, dated October 19, 1880.

Application filed July 9, 1880. (No model.) Patented in Germany September 4, 1877.

*To all whom it may concern:*

Be it known that I, JULIUS PINTSCH, a German citizen, residing at Berlin, Prussia, have invented a new and Improved Packing for Gas Engines and Pipes, of which the following is a correct specification.

This invention relates to an improvement in packings for engines, pipes, and other conduits through which illuminating-gas is passed, for which invention Letters Patent No. 3,968, for fifteen years, were granted to me in the German Empire on the 4th day of September, 1877.

Packings and packing-rings have heretofore either been made of rubber mixed with other substances or pure, or of metal, or of rubber clasped on three sides in a metal case. The gas has an injurious effect upon rubber, deteriorating it and depriving it of its elasticity and packing qualities in a comparatively short space of time. In other words, illuminating-gas has the effect of decomposing india-rubber. Rubber packings *per se* are therefore not practicable for gas engines or conduits. Metallic packings, as such, lack the necessary element of elasticity, and are altogether unreliable as packings for gas under pressure.

Rubber inclosed in a metal trough, as in Patent No. 25,724, has no opportunity to expand laterally, and must be made to bulge out from the open side of the trough to be effective, thereby necessarily exposing part of its body to the gas.

My invention consists of a packing composed of a soft-metal shell having one single upright flange and an india-rubber filler, so arranged that the gas will, by the soft-metal shell, be prevented from reaching the rubber, the rubber serving to impart the necessary degree of elasticity to the soft-metal shell, so that by the combination of the two rings in the manner specified an elastic and gas-proof packing is produced.

In the accompanying drawings, Figure 1 represents a plan or top view of the soft-metal disk or ring. Fig. 2 is a central cross-section thereof. Fig. 3 is a plan view of the rubber disk or ring, and Fig. 4 a cross-section thereof. Fig. 5 is a cross-section of the complete packing.

In the drawings, the letter A represents an annulus made of lead or other soft and readily-yielding metal. It is made with a flat, or nearly flat, base, *a*, and on its inner periphery with a thin upwardly-projecting flange or rim, *b*. This flange or rim is of such thickness that it can be readily folded over the flat portion *a* of the ring.

B is a ring of india-rubber, vulcanite, or other vulcanized india-rubber, and is of such diameter that when placed upon the ring A it will hug and closely embrace the flange *b* and lie flat upon the plate or ring *a*. When the ring B has thus been placed upon the ring A the flange *b* is turned outward over and upon the rubber ring, as shown in Fig. 5, thereby completing the packing.

The packing presents the inner periphery of the ring A to the gas, and prevents thus, as will readily be seen by inspecting Fig. 5, the gas from coming in contact with the rubber or with any part thereof, it being understood, of course, that the packing is properly clamped between the cylinder-head and flange, or between the flanges of two united pieces of pipe, in the manner in which packings are usually clamped.

The rubber is used in the packing for the utilization of its elasticity, serving to properly extend the soft-metal part of the packing, and to impart to it, practically, the quality which ordinarily is looked for in the rubber alone. The outer edge of the rubber is free to expand, thus adding to the effect above described.

For packings which require the external periphery instead of the internal periphery to be brought in contact with the gas the flange *b* is, of course, formed on the external instead of the internal edge of the metal ring A, and lapped over the rubber in manner stated.

I do not limit myself to the annular nor to the circular form of the packing, nor to the exact kind or composition of the soft metal or alloy of which the ring A is made, nor to any peculiar process of treating or vulcanizing the rubber or vulcanite of which the ring B is made.

I have described this invention as intended for specific use in connection with illuminating-gas; but it is evident that it may be used on vessels containing other that illuminating-gas or other substances than gas which would be liable to injuriously affect the india-rubber.

I claim—

The packing composed of the plate A, having one single soft-metal flange, $b$, and of the rubber plate B, over one edge of which said flange $b$ is bent, leaving the other edge free, all constructed and arranged substantially as and for the purpose herein shown and described.

JULIUS PINTSCH.

Witnesses:
FREDK. KÜHNE,
WILLY G. E. SCHULTZ.